(12) United States Patent
Medvinsky et al.

(10) Patent No.: US 11,621,842 B2
(45) Date of Patent: *Apr. 4, 2023

(54) ORIGIN CERTIFICATE BASED ONLINE CERTIFICATE ISSUANCE

(71) Applicant: ARRIS Enterprises LLC, Suwanee, GA (US)

(72) Inventors: Alexander Medvinsky, San Diego, CA (US); Eric J. Sprunk, Carlsbad, CA (US); Xin Qiu, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,092

(22) Filed: Mar. 23, 2021

(65) Prior Publication Data
US 2021/0234691 A1    Jul. 29, 2021

Related U.S. Application Data

(63) Continuation of application No. 15/885,107, filed on Jan. 31, 2018, now Pat. No. 10,958,433.
(Continued)

(51) Int. Cl.
*H04L 9/32* (2006.01)
*H04L 9/08* (2006.01)
(Continued)

(52) U.S. Cl.
CPC .............. *H04L 9/321* (2013.01); *H04L 9/006* (2013.01); *H04L 9/0822* (2013.01);
(Continued)

(58) Field of Classification Search
CPC ....... H04L 9/321; H04L 9/006; H04L 9/0822; H04L 9/0825; H04L 9/0877;
(Continued)

(56) References Cited

U.S. PATENT DOCUMENTS

| 8,370,626 B2 | 2/2013 | Liu et al. |
| 2004/0148505 A1 | 7/2004 | Qiu et al. |

(Continued)

OTHER PUBLICATIONS

PCT International Search Report & Written Opinion, RE: Application No. PCT/US2018/016200, dated Apr. 18, 2018.

*Primary Examiner* — Brian F Shaw
(74) *Attorney, Agent, or Firm* — Chernoff, Vilhauer, McClung & Stenzel, LLP

(57) ABSTRACT

A method provides an origin certificate that can be issued as a digital certificate online. The method includes receiving an origin digital certificate and an encrypted client device private key from an offline certificate authority wherein the client device private key is encrypted according to a private key encryption key PrKEK. The method further includes receiving from the client device, a request for a client device digital certificate and the encrypted client device private key, selecting a digital certificate template for the client device, the digital certificate template having attributes that vary according to the client devices, building the client device digital certificate from the origin digital certificate and the selected digital certificate template, signing the client device digital certificate with an online certificate authority signing key, and transmitting the signed client device digital certificate and the encrypted device private key.

19 Claims, 5 Drawing Sheets

Related U.S. Application Data

(60) Provisional application No. 62/452,750, filed on Jan. 31, 2017.

(51) Int. Cl.
    *H04L 9/40*           (2022.01)
    *H04L 9/00*           (2022.01)

(52) U.S. Cl.
    CPC .......... *H04L 9/0825* (2013.01); *H04L 9/0877* (2013.01); *H04L 9/3247* (2013.01); *H04L 9/3263* (2013.01); *H04L 9/3268* (2013.01); *H04L 63/0823* (2013.01)

(58) Field of Classification Search
    CPC ... H04L 9/3247; H04L 9/3263; H04L 9/3268; H04L 63/0823
    See application file for complete search history.

(56) References Cited

U.S. PATENT DOCUMENTS

| | | |
|---|---|---|
| 2005/0268115 A1 | 12/2005 | Barde |
| 2009/0012805 A1 | 1/2009 | Schnell |
| 2009/0086977 A1 | 4/2009 | Berggren |
| 2010/0313014 A1 | 12/2010 | Medvinsky |
| 2011/0197061 A1 | 8/2011 | Chou et al. |

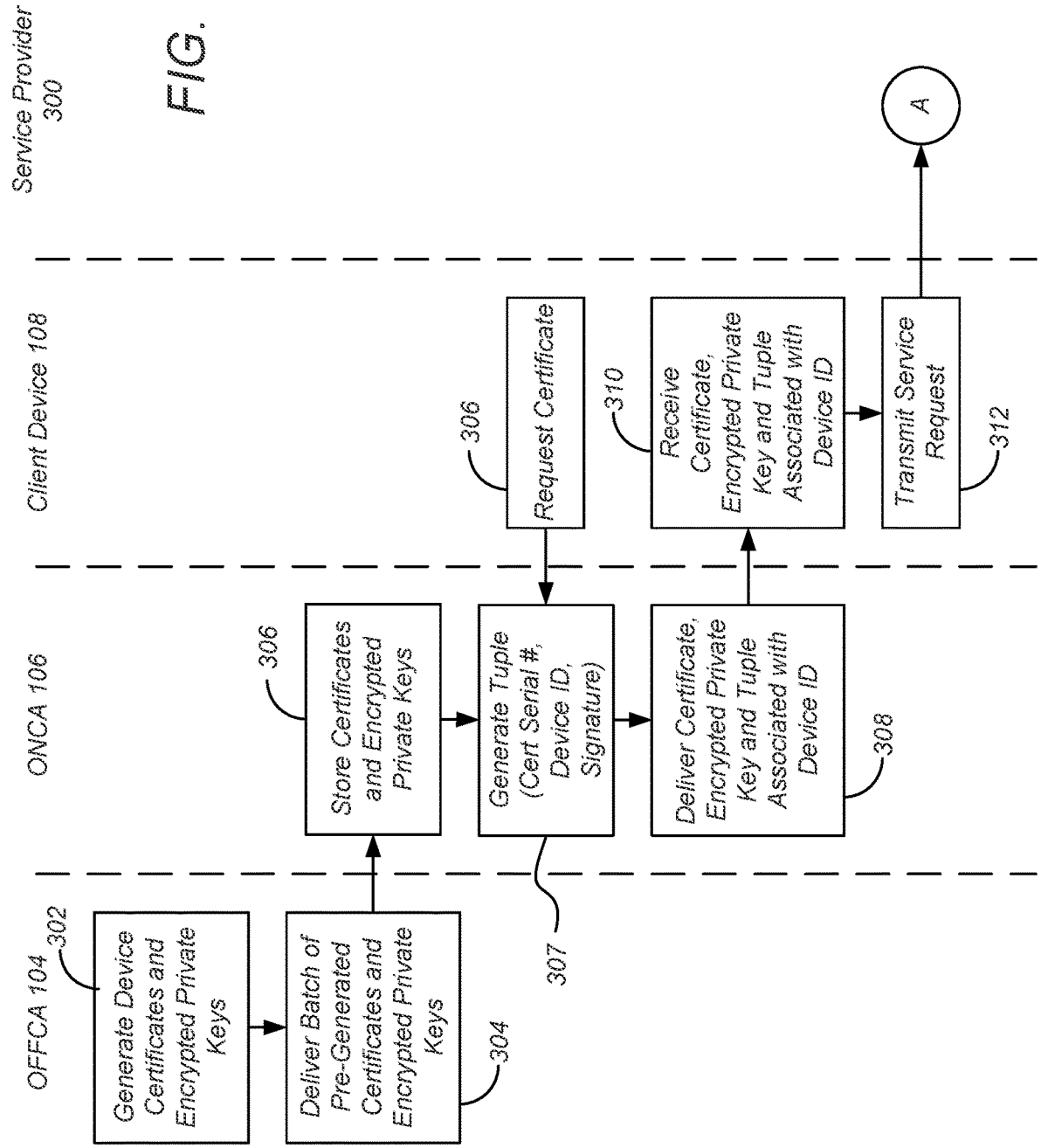

ORIGIN CERTIFICATE BASED ONLINE CERTIFICATE ISSUANCE

CROSS-REFERENCE TO RELATED APPLICATIONS

This present application is a continuation of U.S. patent application Ser. No. 15/885,107 filed Jan. 31, 2018, which claims benefit of U.S. Provisional Patent Application No. 62/452,750, entitled "ORIGIN CERTIFICATE BASED ONLINE CERTIFICATE ISSUANCE," by Alexander Medvinsky, Eric J. Sprunk, Xin Qiu and Paul Moroney, filed Jan. 31, 2017, which application is hereby incorporated by reference herein.

BACKGROUND

1. Field of the Invention

The present invention relates to systems and methods for secure communication, and in particular to a system and method for rapidly issuing digital certificates.

2. Description of the Related Art

A Certificate Authority (CA) is expected to comprise a very secure system. Device manufacturers and service providers depend on CAs to never lose control of secure parameters such as device private keys and the CA private key used to sign device certificates. At the same time, there are a multitude of threats and possible network-based attacks on any online system. Hence, it is normally preferred to keep a CA in a secure offline facility.

However, some certificate profiles and requirements may necessitate an online CA. For example, sometimes it is required to include device characteristics inside a certificate. Such characteristics may include device serial number(s) and identifier(s), device model, software version, hardware version, etc., and it is not always possible for a CA to know such information about a device in advance of the CA request. Instead, it is sometimes necessary for the information to be provided at the time of a certificate request, and online.

In another example, certificate lifetime may be very short, e.g., only a few months. Such short certificate lifetimes may be issued to devices which are not very secure and thus not trusted with the longer-lived certificates. In such cases, certificates that had been issued in batches ahead of being requested may sit on a key server for weeks or even months before they are requested and may be close to their expiration at the time they are needed. To avoid supplying devices certificates that are nearly expired, it is best to issue them online at the time that a certificate is being requested.

Hence, there is a need for a system and method that provides online access to digital certificates upon request and with minimal delay. The system and method described herein satisfies that need.

SUMMARY

To address the requirements described above, the present invention discloses a method, apparatus, and article of manufacture for providing a digital certificate to a client device. In one embodiment, the method comprises receiving, in an intermediary certificate authority, an origin digital certificate and an encrypted client device private key from an offline certificate authority wherein the client device private key is encrypted according to a private key encryption key PrKEK optionally held secret from the intermediary certificate authority, receiving, from the client device, client device information and a request for a client device digital certificate and the encrypted client device private key, selecting a digital certificate template for the client device, the digital certificate template having attributes that vary according to the client devices, building the client device digital certificate from the origin digital certificate, the selected digital certificate template and the client device information, signing the client device digital certificate with an online certificate authority signing key of the intermediary certificate authority, and transmitting the signed client device digital certificate and the encrypted device private key, wherein encrypted client device private key is decrypted according to the private key encryption key PrKEK for use by the client device. Another embodiment is evidenced by a processor having a communicatively coupled memory storing processing instructions for performing the foregoing operations. Still another embodiment is evidenced by receiving, in an intermediary certificate authority from an offline certificate authority, a plurality of digital certificates and a plurality of encrypted client device private keys, each of the plurality of encrypted device private keys paired with only one of the plurality of digital certificates, wherein each client device private key is encrypted according to a private key encryption key PrKEK optionally held secret from the intermediary certificate authority and each of the plurality of digital certificates is associated with a digital certificate identifier, receiving, from the client device, a request for one of the digital certificates, the request comprising a client device identifier, selecting the one of the plurality of digital certificates for the requesting client device, and transmitting a message from the intermediary certificate authority to the client device, wherein the message comprises the selected digital certificate and a tuple pairing the digital certificate identifier of the selected digital certificate and the identifier of the requesting client device signed by the intermediary certificate authority.

BRIEF DESCRIPTION OF THE DRAWINGS

Referring now to the drawings in which like reference numbers represent corresponding parts throughout:

FIGS. 3A and 3B are diagrams illustrating another embodiment of how a digital certificate may be provided to a client device to establish an identity for obtaining services from a service provider.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The features disclosed below provide a system that utilizes an Offline Certificate Authority (OFFCA) to generate client public/private key pairs, encrypt the private keys and issue the corresponding digital certificates. This information is transferred to an intermediary certificate authority or online CA (ONCA) which does not possess the means to decrypt or modify the device private keys. However, the ONCA (at the time of receiving a certificate request) can extract the public key and other relevant information from an initial device certificate (origin certificate) and sign a new device certificate (Final Certificate) which includes information from the request. In this context, the signing of a data refers to a digital signature scheme in which a message or data is "signed" with a signature produced from the data and a private key of a private/public key pair generated by a key generation algorithm. The private key is typically selected uniformly at random from a large set of possible private keys. The message is then transmitted with the public key corresponding to the private key used to sign the message. The recipient of the message can then verify the authenticity of the message (that it came from the sender of the message) using the message, the included public key, and the signature.

This solution allows for flexibility offered only by an ONCA and can generate device certificates with device information which is only available at the time of a certificate request. And it improves security of the system by limiting the functions that the ONCA needs to perform. Since the ONCA is not able to generate, replace or access device private keys and is also limited to what information it can generate and add into Device Certificates, none of the device private keys will be exposed, even if the ONCA is compromised.

The ONCA obtains encrypted device private keys and origin certificates from the Offline CA and therefore cannot generate more device private keys and origin certificates than what has been already provided by the Offline CA. Once a security compromise of the ONCA becomes known, the ONCA no longer receives new encrypted device private keys and origin certificates, limiting how many individual Device Certificates would later need to be revoked and replaced.

Figure 1:
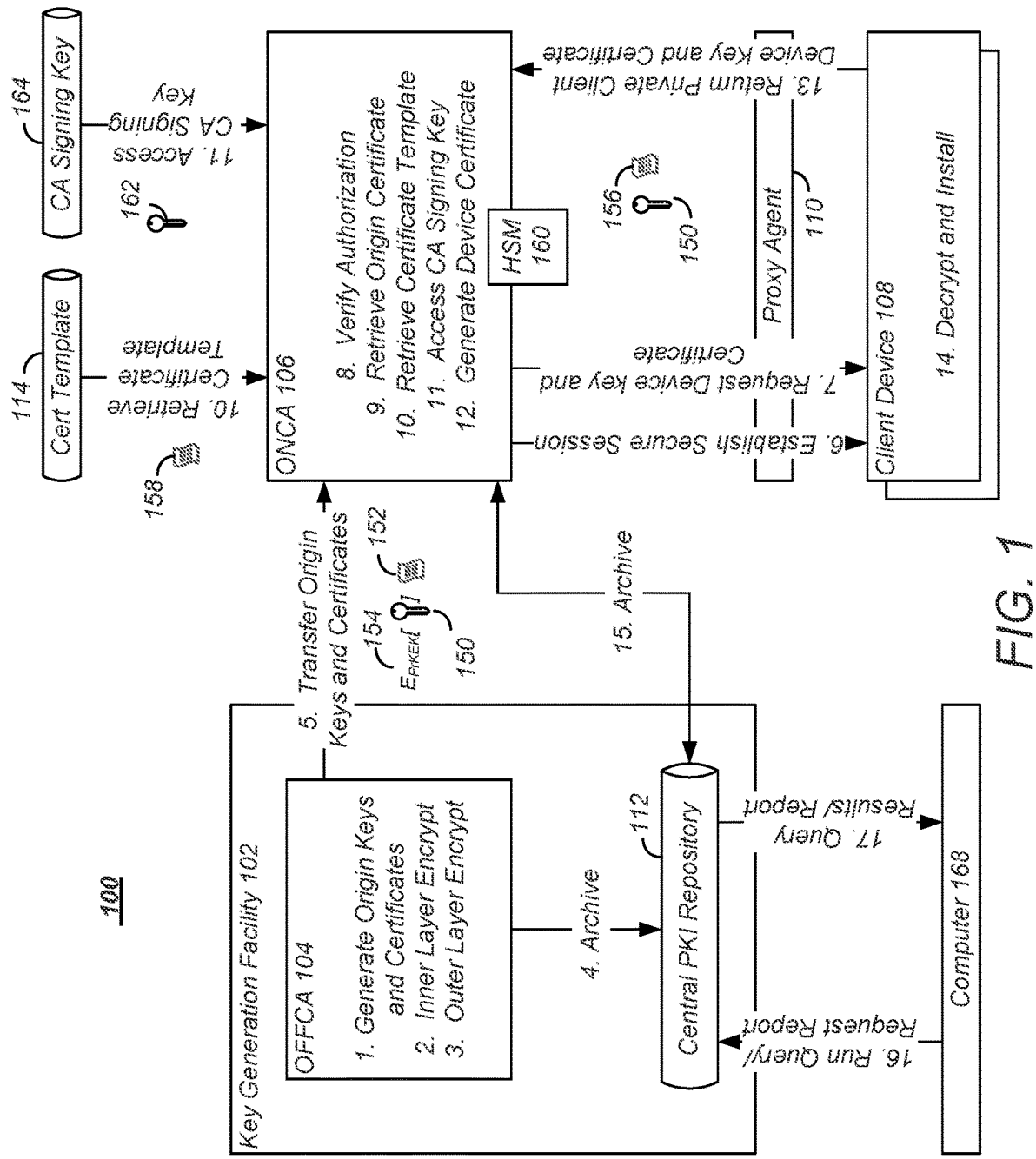
FIG. 1 is a diagram illustrating one embodiment of certificate issuing system.

FIG. 1 is a diagram illustrating one embodiment of certificate issuing system (CIS) 100. The CIS 100 comprises a key generation facility 102 having the OFFCA 104 and the ONCA 106. In one embodiment, the operation of the CIS 100 is described as follows in accordance with the numbered operations shown in FIG. 1.

In the first process, the OFFCA 104 generates device private keys 150, the corresponding public keys, and the origin certificates (which contain the device public keys). The type of the device private key and device public key in the certificate may be Rivest-Shamir-Adleman (RSA), Elliptic Curve, ElGamal, digital signature algorithm (DSA) or any other type of public/private key pair.

In the second process, t the OFFCA 104 encrypts the device private keys 150. In one embodiment, each device private key 150 is separately encrypted using a key that is not accessible to the ONCA 106. For example, the encryption key used to encrypt each of the private keys may be a Private Key Encryption Key (PrKEK) that is global, unique per client device 108 model or may even be a unique value that has been separately pre-provisioned into each target client device 108 or chip within the target client device 108.

Importantly, PrKEK is not available to the ONCA 106, and the ONCA 106 does not need to decrypt or make any further modifications to the device private keys 150 received from the OFFCA 104. In one embodiment, PrKEK is available only to the target client devices 108. In other embodiments having a proxy agent 110 (described further below interposed between the ONCA 106 and the target client devices 108), PrKEK may be available to the proxy agent 110, which provides an indirect network connection between the ONCA 106 and client devices 108. The proxy agent 110 is more fully discussed below.

In one embodiment, an optional second layer of encryption is imposed wherein the device private keys 150 are further encrypted (e.g. double encrypted) using an encryption key that is specific to a particular ONCA 106 instance or server. Hereinafter, that optional encryption key is referred to as an Outer Layer Encryption Key (OLEK). This further encryption of the device private keys 150 according to the OLEK is illustrated in FIG. 1 process three.

In operation four, the OFFCA 104 makes copies of the origin digital certificates and encrypted private keys and archives them in a data repository 112, for example, in the illustrated central PKI repository 112. This archived information can be used to generate reports at a later time or for re-provisioning the device private key and origin certificates to client devices 108 that lose their private key and/or certificate, for example, because of corruption of a memory of the client device 108 itself. This permits the same device PKI to be re-provisioned into such devices.

Regulations or customer requirements may prohibit the saving of device private keys 150 in the data repository 112, or limit the period for which such device private keys 150 may be saved or archived (after which, they must be erased), even when the device private keys 150 are in encrypted form. In such embodiments, the device private keys 150 are not archived as described in operation four. However, even in such cases, the origin digital certificates 152 may be archived, as there are typically no prohibitions to saving or retaining the origin digital certificates 152.

In operation five, the pre-generated (in operation one) and encrypted 154 device private keys 150 and origin certificates 152 are transferred to the ONCA 106. These pre-generated encrypted private keys 150 and origin digital certificates 152 are later retrieved and use by the ONCA 106 in responding to certificate requests from the client devices 108.

Optionally, the interface used to transfer this information is authenticated, e.g., using TLS or SSL, to ensure that all PKI transferred to an ONCA 106 came from a legitimate source and to avoid denial of service attacks.

In operation six, the client device 108 and ONCA 106 establish a secure (encrypted and authenticated) session—for example using 2-way authenticated TLS protocol. This operation is optional since it is possible to encrypt/authenticate each transaction separately (as described below), without using a separately pre-established secure session between the client device 108 and the ONCA 106. Also, a secure session may instead be established between the ONCA 106 and the proxy agent 110 referred to above. In that case, the process of establishing a secure session could occur earlier, any time prior to one of the client devices 108 submitting a request to the ONCA 106 for an identity (operation seven below) via the proxy agent 110.

In process seven, the client device 108 requests an identity that includes a client device private 150 key and a digital certificate. This request may include an identifier of the client device 108 (device ID) and/or serial number as well as client device 108 model information. This optional information may be included in the device certificate 156 that is generated by the ONCA 106 and returned to the client device 108.

The request for the identity may be authenticated (e.g. digitally signed) by the requesting client device 108 using a pre-existing private key and digital certificate that are already stored in the client device 108. This pre-existing private key and digital certificate may be unique in a variety of ways (e.g. unique among all devices from all sources, unique among devices from a particular source or among devices of a particular class or model).

The request may be delivered directly to the ONCA 106 or it may be first delivered to the proxy agent 110. The proxy agent 110 may simply forward the request message as is to the ONCA 106.

Alternatively, the proxy agent 110 may verify the signature on the request message (if the message includes a signature) as well as check authorization of the requesting client device 108 for requesting certificates. If both checks pass, then the proxy agent 110 re-signs the same request with the signing key belonging to the proxy agent 110, and forwards the message to the ONCA 106.

In some embodiments, in addition to or instead of a secure session established during process six, this request message may include a Client Key Agreement Public Key (CKAPK). CKAPK may for example be a Diffie-Hellman (DH) or Elliptic Curve Diffie-Hellman (ECDH) public key and it will be utilized to protect the private key that is returned by ONCA 106 in a later step. CKAPK may be generated by either the client device 108 or by the proxy agent 110. CKAPK needs to be generated together with the corresponding Client Key Agreement Private Key CKAPrK, as they are paired keys.

In operation eight, ONCA 106, upon receiving the request, first validates the provided authorization by assuring that whichever entity signed the request (either proxy agent 110 or client device 108) is authorized to obtain the identity for the client device 108 (e.g. client device certificate and device private key) which is being requested. If authorization fails, ONCA 106 returns an error code rather than a valid device private key 150 and device certificate 156.

In operation nine, ONCA 106 finds the next available (not yet assigned to a client device 108) origin certificate 152 and encrypted device private key 150 from its local repository (i.e., database). ONCA 106 later generates a new device certificate 156 that is derived from the origin certificate 152 while keeping the encrypted device private key 150 the same as the encrypted device private key 150.

In operation ten, after validating authorization, ONCA 106 finds a certificate template 158 that matches a specific client device 108 model for this request from a certificate template database 114. A certificate template 158 includes information such as certificate lifetime and various certificate attributes and extensions that are required to be present in the device certificate 156. The same set of origin certificates 152 that are issued by the same OFFCA 104 and have the same profile can be mapped to different certificate templates and different signing key based on a configuration of the ONCA 106. Or they can be paired with one specific certificate template.

Many of such attributes and extensions may already be present in origin certificates 152 generated by the OFFCA 104. However, some attributes such as a device ID, chip ID, device serial number, device software (SW) and hardware (HW) version may not have been known ahead of time to the OFFCA 104. In one embodiment, the certificate template 158 indicates which of those attributes need to be added to the origin certificate 152 to generate the device certificate 156 issued by ONCA 106 and where such attributes fit into the device certificate 156.

It is possible for multiple client device 108 models to share the same certificate template 158. The reverse is also true—it is possible for one client device 108 model to support multiple certificate templates 158. In the latter case, a request message sent in step 7 would specify which certificate template 158 is being requested. Optionally, the ONCA 106 may determine which certificate template and which signing key should be applied to the new client device certificate based on information in the request message coming from the device.

Optionally, the certificate template 158 may contain a digital signature from the OFFCA 104 which needs to be verified by the ONCA 106 before the certificate template 158 can be used. This digital signature guards against unauthorized corruption of the certificate templates 158 in the ONCA's certificate template database 114.

Before generating a client device certificate 156, the ONCA 106 accesses a Certificate Authority signing key 162 that the ONCA 106 will use to sign the client device digital certificate 156. This CA signing key 162 is typically referenced by the certificate template 158. This CA signing key 162 may be stored in a hardware security module (HSM) 160 which is communicatively coupled to a computer or other hardware device of the ONCA 106. In that case, ONCA 106 obtains a handle to the CA Signing Key 162 inside the HSM 160, and the handle can be later used to sign a device certificate 156.

In other cases, the CA signing key 164 may be stored as an encrypted value which is referenced by the certificate template 158. In such an embodiment, the ONCA 106 sends the encrypted CA signing key 162 to the HSM 160, and the HSM 160 "unwraps" (e.g. decrypts) the CA signing key 162 inside the HSM 160. The ONCA 106 then utilizes the CA signing key 162 to sign the device certificate 156.

In operation twelve, the ONCA 106 builds a device certificate 156 containing the encrypted device public key and selected other attributes from the origin certificate 152 which was retrieved in step 9. The remaining attributes in the new device certificate 156 are determined based on the certificate template 158. Normally, that would include a validity period starting date based on the current date & time and a validity period ending date based on the device certificate 156 lifetime determined by the certificate template 158. Other data such as a client device 108 identifier or serial number as well as other client device 108 attributes specified by the certificate template 158 may be added to the device certificate 156 during this step. The ONCA 106 then signs the new device certificate 156 using the CA signing key 162 which is typically protected inside the HSM 160.

In operation thirteen, the ONCA 106 returns the just issued client device certificate 156 along with the corresponding encrypted device private key 150 (which are copied unchanged from the database or repository 112) to the requesting client device 108 in the response message. In addition to the optional protection provided by a secure session between the ONCA 106 and the requesting client device 108, the encrypted device private key 150 may be further encrypted with a KAEK (Key Agreement Encryption Key). The KAEK is derived from a key agreement protocol such as Diffie-Hellman (DH) or Elliptic Curve Diffie-Hellman (ECDH).

Optionally in this step, ONCA also returns the origin certificate 152 containing the same device public key as the just issued device certificate 156.

Figure 2:
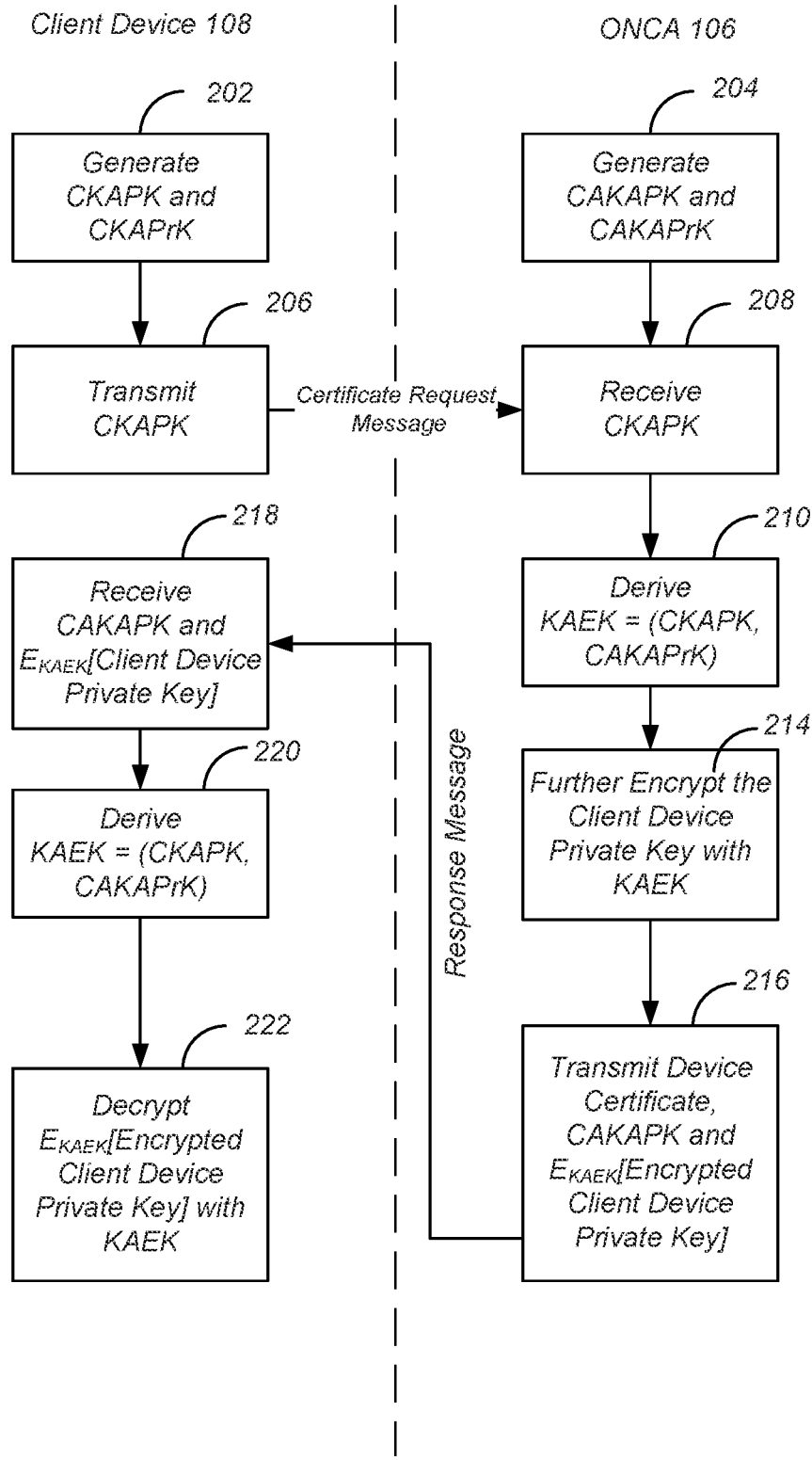
FIG. 2 is a diagram illustrating the derivation and use of a key agreement encryption key.

FIG. 2 is a diagram illustrating the derivation and use of the KAEK. The client device 108 generates a client key agreement public key (CKAPK) and a corresponding client key agreement private key (CKAPrK) as shown in block 202. Similarly, the ONCA 106 generates CA key agreement public key (CAKAPK) and corresponding CA key agreement private key (CAKAPrK), as shown in block 204. In block 206, the client device 108 transmits the CKAPK to the ONCA 106 as a part of the request message, as shown in block 206. The ONCA 106 receives the client key agreement public key CKAPK in block 208, and uses the received client key agreement public key CKAPK to derive the KAEK from the client key agreement public key CKAPK and the CA key agreement private key CAKAPrK. This can be accomplished using a variety of methods including:

Diffie-Hellman KAEK=Derive (CKAPK$^{CAKAPrK}$ mod p) and

Elliptic Curve DH KAEK=Derive (CAKAPrK*CKAPK)

where '*' denotes a special elliptic curve multiply operation that is well-known to those skilled in cryptography, and p denotes a prime number. The ONCA 106 then further encrypts the encrypted client device private key with the KAEK to generate the further encrypted client device private key ($E_{KAEK}$ [Encrypted Client Device Private Key]), and transmits the client device certificate 156 and the further encrypted device private key to the client device 108 in the response message. In blocks 218 and 220, the client device 108 receives the response message, and uses the CA key agreement public key CAKAPK and the client key agreement private key CKAPrK to generate the key agreement encryption key KAEK. Then, in block 222, the client device 108 decrypts the further encrypted client device private key using the generated key agreement encryption key KAEK to produce the encrypted client device private key.

In operation fourteen, the client device 108 optionally verifies that a received device certificate 156 is valid and has a valid CA signature (using the CA signing key 162), then decrypts one or more layers of encryption from the device private key 150. For example, two layers of encryption may be inner-layer encryption with PrKEK (that was originally added by OFFCA 104) followed by outer-layer encryption with KAEK described in the previous operation. All such encryption layers are removed (the outer layer encryption with KAEK removed as shown in block 222 of FIG. 2), after which the client device 108 verifies that the fully decrypted device private key 150 corresponds to the device certificate 156 and the device private key contained therein.

Alternatively, the proxy agent 110 can perform the above verification and decryption steps and then can forward device certificate 156 and device private key 150 the target client device 108 over a separate connection.

Once the client device 108 possesses a fully decrypted and verified device certificate 156 and device private key 150, the device certificate 156 and device private key 150 are installed locally on the target client device 108. Additional protection (for example, protection local to the device) may be added such as encryption or hardware based protection by use of a secure memory or a secure CPU in the client device 108.

Alternatively, the inner-layer encryption with PrKEK that was originally added to the device private key 150 by OFFCA 104 may remain and the device private key 150 encrypted with PrKEK may be stored in that manner persistently in the target client device 108. In such an embodiment, the target client device 108 removes the encryption with PrKEK from the device private key 150 each time that it is utilized internally within the client device 108 to perform a crypto operation such as decryption or digital signature.

The origin certificate 152 may also be transmitted by the ONCA 106 to the client device 108 in the previous operation. In this case, the origin certificate 152 may be persistently saved in the client device 108 along with the device certificate 156 and the encrypted device private key 150. The origin certificate 152 may have a longer lifetime than the matching device certificate 156 derived from the origin certificate 152 and may be utilized in the future to request other or additional device certificates 156.

As shown in operation fourteen, device certificates 156 that had been generated by ONCA 106 can be optionally copied back to the central PKI repository 112 for archival and for subsequent queries and reports.

In operation sixteen, an authorized administrator using a key generation facility administrative processor (for example, an individual working for a network operator which had deployed the client devices 108 may want to run some queries or reports on the device certificates that had been installed on client devices 108 in their network. The queries may count numbers of client devices 108 of various models that had been provisioned with client device certificates 156, run reports for specific time periods, for specific factory locations (if certificate provisioning took place in a factory), etc.

In operation seventeen, a report may be optionally generated based on the contents of the central PKI repository 112 and returned back to the requesting administrator.

Further Alternative Embodiments

Many client devices 108 implementing digital rights management (DRM) systems may be manufactured without a DRM specific identity based on a certificated public key. Examples of such systems include retail clients such as ANDROID and iOS devices, where the DRM system vendor cannot control manufacture of the devices, and set top boxes (STBs) that are manufactured without such a specific identity. In such cases, an identity must be downloaded to the client devices 108 in the field on demand. Hence, it is frequently desired to associate some hardware based or device based identifier with a DRM identity of a client device 108.

Figure 3B:
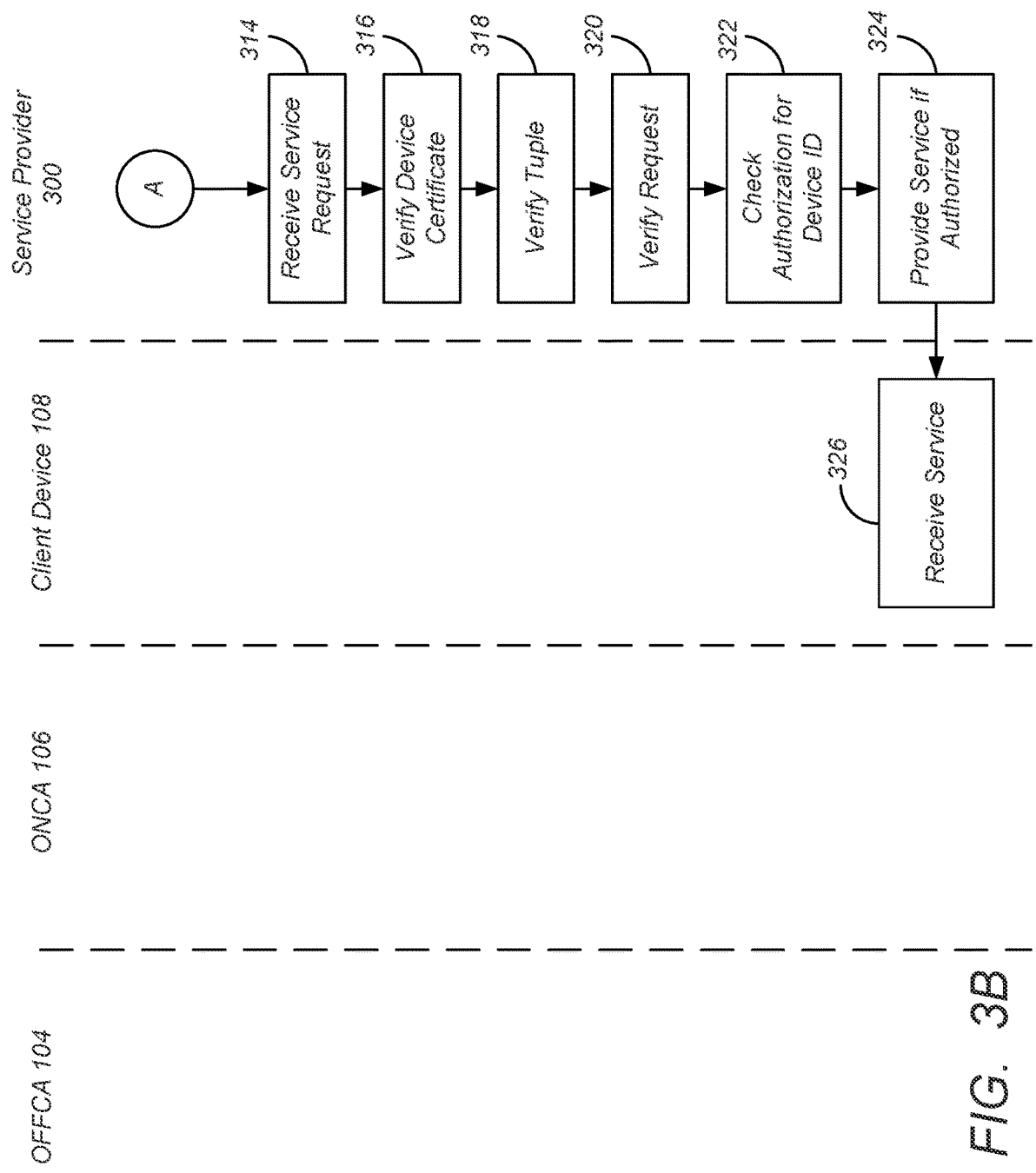

FIGS. 3A and 3B are diagrams illustrating another embodiment of how a digital certificate may be provided to a client device to establish an identity for obtaining services from a service provider. In block 302, the OFFCA 104 generates a plurality of client device certificates and encrypted private keys. Each client device certificate includes the public key corresponding to the (encrypted) private key, and each private key is encrypted according to a private key encryption key (PrKEK) held secret from the intermediary certificate authority but known to the client device 108 and/or the service provider 300. In block 304, these pre-generated (e.g. generated before the items are requested by the client device 108) digital certificates 152 and encrypted device private keys 150 are delivered to the ONCA 106. In block 306, the pre-generated digital certificates and encrypted private keys are stored for later use.

In block 306, the client device 108 requests a digital certificate by sending a digital certificate request message to the ONCA 106. The digital certificate request message comprises an identifier of the device (device ID), which is preferably globally unique, and may be signed with a global key. In block 306, the ONCA 106 receives the digital certificate request messages, and verifies the request from the client device using the global key. If the digital certificate request message cannot be verified, the request is denied. Otherwise, one of the pre-generated certificates is chosen, and the ONCA 106 generates a tuple having a unique identifier of the chosen certificate such as a certificate serial number, and the device ID. The ONCA 106 then signs the tuple with a key assigned to the ONCA 106. The ONCA 106 then transmits the selected digital certificate, the encrypted private key corresponding to the device certificate, and the signed tuple to the client device 108, in digital certificate response message as shown in block 308. In block 310, the client device 108 receives the digital certificate response message, and decrypts the encrypted private key using the PrKEK so it may sign messages sent to the service provider 300. The client device 108 then transmits a service request to the service provider 300, as shown in block 312. In one embodiment, the service request comprises the digital certificate and tuple received from the ONCA 106, and is signed by the client device using the client device public key obtained from the received certificate.

In block 314, the service provider 300 receives the service request. In block 316, the service provider verifies the device certificate using an OFFCA CA public key—either preconfigured into the service provider's system or extracted from an accompanying OFFCA certificate. If OFFCA certificate is included in the service request, its signature is validated by the preconfigured Offline Root CA public key. In block 318, the service provider 300 verifies the tuple received from the ONCA 106 via the client device 108 using the signature applied by the ONCA 106 and the ONCA public key. The ONCA public key is preconfigured into the service provider's system or extracted from an accompanying ONCA certificate. If OFFCA certificate is included in the service request, its signature is validated by the preconfigured Offline Root CA public key. In block 320 Service Provider verifies the service request from the client device 108 using the device public key found in the Device Certificate. If all verifications are successful, the service provider 300 checks to see if service is authorized for the client ID included in the tuple, as shown in block 322. If service is authorized, it is provided, as shown in blocks 324 and 326. If it is not authorized, the service request is denied via a service denial message.

Hardware Environment

Figure 4:
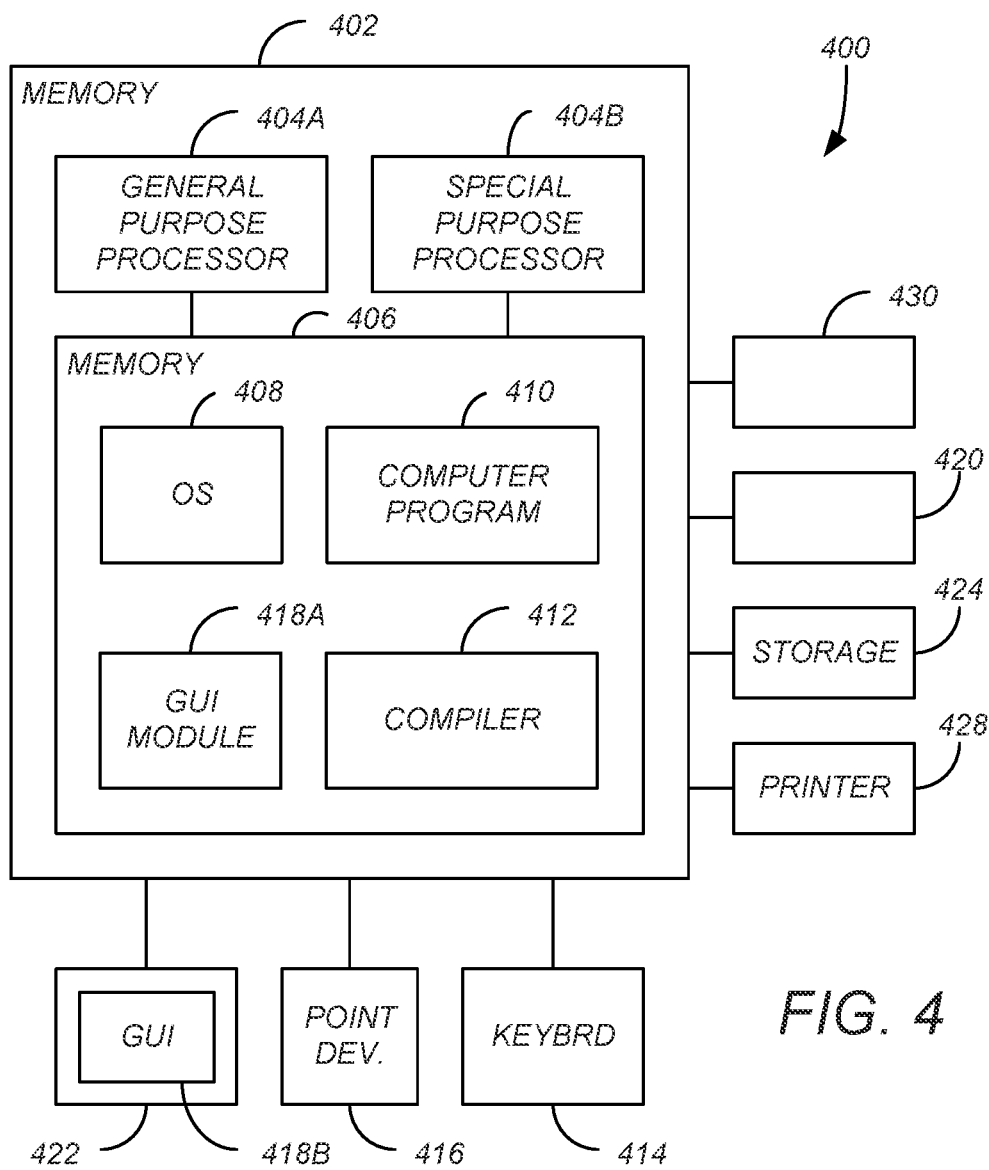
FIG. 4 is a diagram illustrating an exemplary computer system that could be used to implement elements of the certificate issuing system.

FIG. 4 is a diagram illustrating an exemplary computer system 400 that could be used to implement elements of the present invention, including the OFFCA 104, central PKI repository 112, ONCA 106 and/or key generation facility administrative processor 168. The computer 402 comprises a general-purpose hardware processor 404A and/or a special purpose hardware processor 404B (hereinafter alternatively collectively referred to as processor 404) and a memory 406, such as random-access memory (RAM). The computer 402 may be coupled to other devices, including input/output (I/O) devices such as a keyboard 414, a mouse device 416 and a printer 428.

In one embodiment, the computer 402 operates by the general-purpose processor 404A performing instructions defined by the computer program 410 under control of an operating system 408. The computer program 410 and/or the operating system 408 may be stored in the memory 406 and may interface with the user and/or other devices to accept input and commands and, based on such input and commands and the instructions defined by the computer program 410 and operating system 408 to provide output and results.

Output/results may be presented on the display 422 or provided to another device for presentation or further processing or action. In one embodiment, the display 422 comprises a liquid crystal display (LCD) having a plurality of separately addressable pixels formed by liquid crystals. Each pixel of the display 422 changes to an opaque or translucent state to form a part of the image on the display in response to the data or information generated by the processor 404 from the application of the instructions of the computer program 410 and/or operating system 408 to the input and commands. Other display 422 types also include picture elements that change state in order to create the image presented on the display 422. The image may be provided through a graphical user interface (GUI) module 418A. Although the GUI module 418A is depicted as a separate module, the instructions performing the GUI functions can be resident or distributed in the operating system 408, the computer program 410, or implemented with special purpose memory and processors.

Some or all of the operations performed by the computer 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 402 may also implement a compiler 412 which allows an application program 410 written in a programming language such as COBOL, C++, FORTRAN, or other language to be translated into processor 404 readable code. After completion, the application or computer program 410 accesses and manipulates data accepted from I/O devices and stored in the memory 406 of the computer 402 using the relationships and logic that was generated using the compiler 412.

The computer 402 also optionally comprises an external communication device such as a modem, satellite link, Ethernet card, or other device for accepting input from and providing output to other computers.

In one embodiment, instructions implementing the operating system 408, the computer program 410, and/or the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, or a flash drive. Further, the operating system 408 and the computer program 410 are comprised of computer program instructions which, when accessed, read and executed by the computer 402, causes the computer 402 to perform the steps necessary to implement and/or use the present invention or to load the program of instructions into a memory, thus creating a special purpose data structure causing the computer to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 402.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of providing a digital certificate to a client device, comprising:
    (a) receiving, from an offline certificate authority, an origin digital certificate and an encrypted client device private key encrypted and decrypted according to a private key encryption key;
    (b) receiving, from the client device, client device information and a request for: (i) a client device digital certificate; and (ii) the encrypted client device private key;
    (c) building the client device digital certificate from the origin digital certificate, the client device information, and a selected digital certificate template having attributes that vary according to client devices;
    (d) transmitting the encrypted client device private key and a client device digital certificate signed with an online certificate authority signing key.

2. The method of claim 1, wherein the origin digital certificate is generated in advance of the request for the client device digital certificate and the encrypted device private key.

3. The method of claim 2, wherein steps (c)-(d) are performed only in response to a determination that the client device is authorized to receive the client device digital certificate and the encrypted client device private key.

4. The method of claim 3, wherein: the encrypted client device private key is further encrypted according to a second key specific to an intermediary certificate authority; and the method further comprises decrypting, the further encrypted client device private key to produce the encrypted client device private key.

5. The method of claim 3, wherein the method further comprises selecting the digital certificate template from among a plurality of pre-existing origin digital certificate templates according to the client device information.

6. The method of claim 5, wherein the client device information comprises a client device identifier unique to the client device.

7. The method of claim 6, wherein the online certificate authority signing key is referenced by the selected digital certificate template.

8. The method of claim 7, further comprising:
    receiving an encrypted online certificate authority signing key;
    transmitting the encrypted online certificate authority signing key to a hardware security module for decryption; and
    receiving a decrypted encrypted online certificate authority signing key from the hardware security module.

9. The method of claim 1, wherein the method further comprises:
    receiving a client key agreement public key, the client key agreement public key associated with a client key agreement private key;
    further encrypting the encrypted client device private key according to a key agreement encryption key generated from the received client key agreement public key and an intermediary certificate authority key agreement private key associated with an intermediary certificate authority key agreement public key; and
    transmitting the further encrypted origin private key and the intermediary certificate authority key agreement public key.

10. The method of claim 9, further comprising decrypting the further encrypted client device private key using the client key agreement private key to produce the encrypted client device private key.

11. The method of claim 1, wherein the client device digital certificate comprises a digital signature of the offline certificate authority from the origin digital certificate.

12. An apparatus for providing a digital certificate to a client device, comprising:
    a processor:
    a memory, communicatively coupled to the processor, the memory storing processor instructions comprising processor instructions for:
        (a) receiving, from an online certificate authority, an origin digital certificate and an encrypted client device private key encrypted and decrypted according to a private key encryption key;
        (b) receiving, from the client device, client device information and a request for: (i) a client device digital certificate; (ii) and the encrypted client device private key;
        (c) building the client device digital certificate from the origin digital certificate, the client device information, and a selected digital certificate template having attributes that vary according to client devices; and
        (d) transmitting the encrypted client device private key and a client device digital certificate signed with an online certificate authority signing key.

13. The apparatus of claim 12, wherein the origin digital certificate is generated in advance of the request for the client device digital certificate and the encrypted device private key.

14. The apparatus of claim 13, wherein processor instructions (c)-(d) are performed only in response to a determination that the client device is authorized to receive the client device digital certificate and the encrypted client device private key.

15. The apparatus of claim 14, wherein: the received encrypted client device private key is further encrypted according to a second key specific to an intermediary certificate authority; and the processor instructions further comprise instructions for decrypting, the further encrypted client device private key to produce the encrypted client device private key.

16. The apparatus of claim 15, wherein:
- the request for the client device digital certificate comprises client device information; and
- the processor instructions further comprise instructions for selecting the digital certificate template from among a plurality of pre-existing origin digital certificate templates according to the client device information.

17. The apparatus of claim 16, wherein the client device information comprises a client device identifier unique to the client device.

18. The apparatus of claim 17, wherein the online certificate authority signing key is referenced by the selected digital certificate template.

19. The apparatus of claim 18, wherein the online certificate authority signing key is stored only in a hardware security module of the apparatus.

* * * * *